US011231990B2

(12) United States Patent
Otterstedt

(10) Patent No.: US 11,231,990 B2
(45) Date of Patent: Jan. 25, 2022

(54) DEVICE AND METHOD FOR GENERATING ERROR CORRECTION INFORMATION

(71) Applicant: Infineon Technologies AG, Neubiberg (DE)

(72) Inventor: Jan Otterstedt, Unterhaching (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 0 days.

(21) Appl. No.: 16/688,240

(22) Filed: Nov. 19, 2019

(65) Prior Publication Data

US 2020/0159613 A1    May 21, 2020

(30) Foreign Application Priority Data

Nov. 20, 2018 (DE) .......................... 102018219877.2

(51) Int. Cl.
*G06F 11/10* (2006.01)
*G06F 11/07* (2006.01)

(52) U.S. Cl.
CPC .......... *G06F 11/102* (2013.01); *G06F 11/076* (2013.01); *G06F 11/1004* (2013.01); *G06F 11/1044* (2013.01)

(58) Field of Classification Search
CPC .. G06F 11/106; G06F 11/102; G06F 11/1076; G06F 11/1004; G06F 11/1044; G11C 29/42; G11C 29/52; G11C 29/44; G11C 13/0033
See application file for complete search history.

(56) References Cited

U.S. PATENT DOCUMENTS

| 6,570,782 | B1 * | 5/2003 | Brandenberger ...... G11C 17/00 365/100 |
| 9,471,417 | B1 * | 10/2016 | Asnaashari ........... G06F 11/106 |
| 2014/0164873 | A1 | 6/2014 | Guyot et al. |
| 2015/0143185 | A1 * | 5/2015 | Motwani ............. G06F 11/1048 714/718 |
| 2016/0350178 | A1 * | 12/2016 | Lien ....................... G11C 29/44 |
| 2016/0380651 | A1 | 12/2016 | Hughes |
| 2018/0366187 | A1 * | 12/2018 | Chien ................ G11C 13/0033 |

FOREIGN PATENT DOCUMENTS

DE    112012002843 T5    3/2014

OTHER PUBLICATIONS

Stuart Schechter, et. al.; Use ECP, not ECC, for Hard Falures in Resistive Memories; In Proceedings of the 37th Annual International Symposium on Computer Architecture, Saint Malo, France, Jun. 29-23, 2010.

* cited by examiner

*Primary Examiner* — Shelly A Chase
(74) *Attorney, Agent, or Firm* — Cooper Legal Group, LLC

(57) ABSTRACT

A device comprises an electronic data memory and a control unit configured to store a bit sequence in the electronic data memory as a stored bit sequence. The control unit is configured to check the stored bit sequence for bit errors, to generate error correction information having information about a correct bit value in the stored bit sequence, and to store the error correction information.

31 Claims, 13 Drawing Sheets

DEVICE AND METHOD FOR GENERATING ERROR CORRECTION INFORMATION

RELATED APPLICATION

This application claims priority to German Patent Application No. 102018219877.2, filed on Nov. 20, 2018, entitled "Vorrichtung and Verfahren zum Erzeugen einer Fehlerkorrekturinformation", which is incorporated herein.

SUMMARY

The present disclosure relates to a device for generating error correction information for a bit sequence. For example, the present disclosure relates to an improvement of a performance of an error correction code by means of error correction code auxiliary data.

Information can be stored as bit sequences and/or data words in volatile and/or nonvolatile memories. For a later use, the bit sequences can be read again from the data memory and be processed. Error correcting codes can be used to correct errors in the stored data words.

Devices and methods enabling error correction with little expenditure of memory capacity would be desirable.

Exemplary embodiments provide a device comprising an electronic data memory and a control unit configured to store a bit sequence in the electronic data memory as a stored bit sequence. The control unit is configured to check the stored bit sequence for bit errors, to generate error correction information comprising information about a correct bit value in the stored bit sequence. The control unit is configured to store the error correction information (e.g., the error correction information may be stored for later use). Since only a small number of bit sequences (e.g., a number of bit sequences less than a threshold number of bit sequences) may be stored with errors, storage of a corresponding small number of items of error correction information for erroneous bit sequences enables efficient error correction in conjunction with little memory demand. The information about the correct bit value enables a direct and immediate correction of the erroneous bit sequence since the error correction information makes it possible to use the correct value of the bit instead of an erroneous value.

In accordance with one exemplary embodiment, a device comprises an electronic data memory configured to store a stored bit sequence. A control unit of the device is configured to determine and/or obtain stored error correction information assigned to the stored bit sequence. The stored error correction information comprises information about a correct bit value in the stored bit sequence. The control unit is configured to at least partly correct the stored bit sequence using the error correction information to determine and/or obtain a corrected bit sequence.

In accordance with one exemplary embodiment, a method comprises storing a bit sequence in an electronic data memory as a stored bit sequence, checking the stored bit sequence for bit errors, generating error correction information comprising information about a correct bit value in the stored bit sequence, and storing the error correction information (e.g., storing the error correction information for later use).

In accordance with one exemplary embodiment, a method comprises determining and/or obtaining stored error correction information assigned to a stored bit sequence. The stored error correction information comprises information about a correct bit value in the stored bit sequence. The method comprises at least partly correcting the stored bit sequence using the stored error correction information to determine and/or obtain a corrected bit sequence.

Further exemplary embodiments are defined in the dependent claims.

DESCRIPTION OF THE DRAWINGS

Exemplary embodiments are explained below with reference to the accompanying drawings, in which.

DETAILED DESCRIPTION

Before exemplary embodiments are explained more specifically in detail below with reference to the drawings, it is pointed out that identical, functionally identical and/or identically acting elements, objects and/or structures are provided with the same reference signs in the various figures, such that the description of said elements that is presented in the various exemplary embodiments is mutually interchangeable or can be applied to one another.

Exemplary embodiments below relate to devices comprising an electronic data memory and a control unit configured to store a bit sequence in the electronic data memory or to read a bit sequence from the electronic data memory. Although the exemplary embodiments below relate in particular to nonvolatile data memories, for instance flash memories, resistive RAM memories—RRAM (RAM=Random Access Memory) and/or the like, the exemplary embodiments are not restricted thereto, but rather can also be used without restrictions in at least partial cooperation with volatile memories, for instance traditional RAM memories, dynamic RAM memories (DRAM), static RAM memories (SRAM) and/or so-called emerging memories, i.e. new kinds of memories and/or the like.

Figure 1:
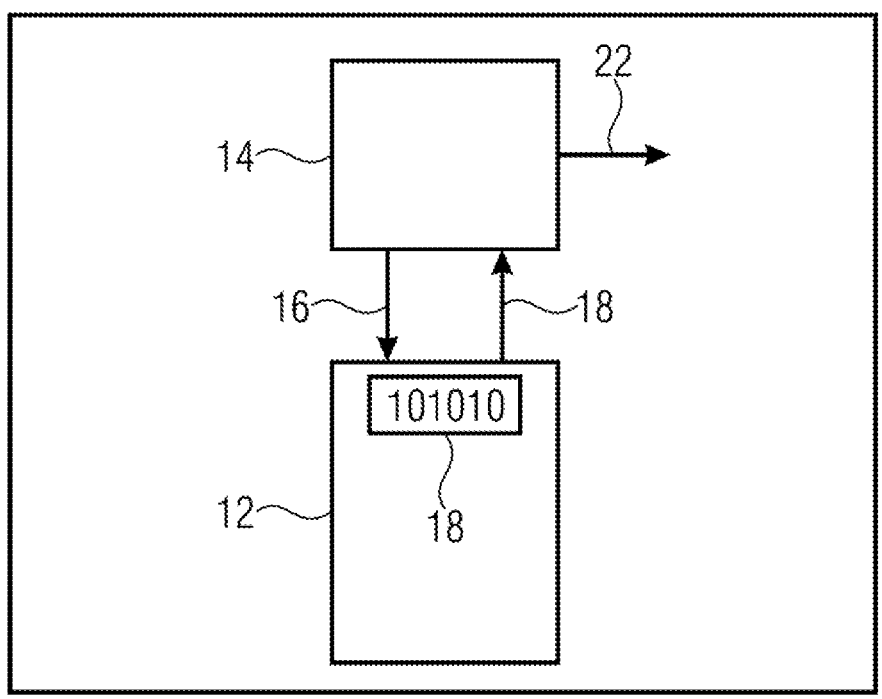
FIG. 1 shows a schematic block diagram of a device in accordance with one exemplary embodiment.

FIG. 1 shows a schematic block diagram of a device 10 in accordance with one exemplary embodiment. The device 10 comprises an electronic data memory 12, for example a volatile and/or nonvolatile memory, for instance a resistive RAM (RRAM). The electronic data memory 12 is configured to store one or more bit sequences and/or data words, wherein for example each bit sequence can be stored at an address assigned to it in the electronic data memory 12. The address denotes for example a group of memory cells, wherein each memory cell is configured to store at least one bit of information. The address can thus refer to a group of memory cells which are correspondingly programmed for storing the bit sequence. In the context of the exemplary embodiments described herein, this property of the memory cells is used synonymously with an address of the bit sequence. In accordance with one exemplary embodiment, the device 10 is configured for example as a smart card.

The device 10 comprises a control unit 14, which can carry out a write access and a read access to the electronic data memory 12. The control unit is configured to store a bit sequence 16 in the electronic data memory 12 in order to generate a stored bit sequence 18 in the electronic data memory 12. In an error-free case, the stored bit sequence 18 corresponds to the bit sequence 16. Errors can occur, however, which have the effect that the stored bit sequence 18 differs from the bit sequence 16 in at least one bit. Such a difference can also be referred to as bit error and can have the effect that a memory cell has a bit value deviating from the value which is programmed successfully and/or unsuccessfully during storage. By way of example, data retention errors (referred to as: retention related failures) can have the effect that the stored bit sequence 18 has bit errors over time. Alternatively and/or additionally, endurance errors (referred to as: endurance related failures) can have the effect that a bit sequence is stored already with errors, for instance as a result of errors in individual memory cells that prevent error-free programming. Such errors can be caused by instances of damage in memory cells which already occur during production and/or occur as a result of fatigue of the memory cells.

The control unit 14 is configured to check the stored bit sequence 18 for bit errors. The control unit 14 knows the bit sequence 16 to be stored and can determine on the basis thereof whether the stored bit sequence 18 corresponds to the bit sequence 16 to be stored, for instance on the basis of a bit-by-bit comparison. The control unit 14 can be configured to generate error correction information 22 comprising information about a correct bit value in the stored bit sequence 18. For example, the error correction information 22 can relate to bits regarding which deviations between the bit sequences 16 and 18 have been determined and/or ascertained. The control unit 14 can be configured to store the error correction information 22 for a later use. The error correction information can be stored in the electronic data memory 12 and/or some other data memory.

For the purpose of reading the stored bit sequence 18 in order to determine whether the stored bit sequence 18 has bit errors, the control unit can carry out a regular read operation, such as is carried out for the regular read-out of data from the electronic data memory 12. Alternatively and/or additionally, exemplary embodiments provide for the control unit 14 to alter parameters of the read operation, for instance a read duration, a read voltage applied to the memory cells, and/or the like. This can have the effect, for example, that reading is artificially hampered in order to simulate errors becoming apparent in the memory cells and thus to obtain a safety margin with regard to the assessment of the read errors. In accordance with exemplary embodiments, it is possible to alter a threshold value and/or a decision threshold that is established in order to evaluate a read variable such as electrical voltage, electrical current, electrical resistance value and/or the like and thus to differentiate between two or more logic variables, for instance 0 and 1. In this regard, e.g., for establishing a margin, the threshold value can be shifted in the direction "0" and/or in the direction "1", and/or it is possible to carry out a shift alternately in both directions. In the first case, only with the margin are error-free bits, for instance so-called good 0s, identified as 0 and, in the other case, only with the margin are error-free 1s identified as so-called good 1s. This makes it possible to obtain a safety margin and/or a read reserve.

Various contents and/or meanings of the error correction information 22 are explained by way of example below with reference to FIGS. 2a to 2d. The meanings explained in this context can be stored, be coded and/or be transmitted as bit sequence for the later use. The error correction information can have the information represented and/or at least be interpreted to that effect. The explanations with reference to FIGS. 2a to 2d should be understood here only qualitatively for illustrating how exemplary information about a correct bit value in the stored bit sequence can be contained in the error correction information.

The bit sequence 16 and the stored bit sequence 18 are represented in each case as bit sequences and/or data words having a length of 8 bits. In accordance with further exemplary embodiments, the bit sequences 16 and 18 can have a different length of at least one bit, for instance at least 2 bits, at least 4 bits, at least 8 bits, at least 11 bits, at least 16 bits, at least 32 bits and/or any other length desired.

Figure 2A:
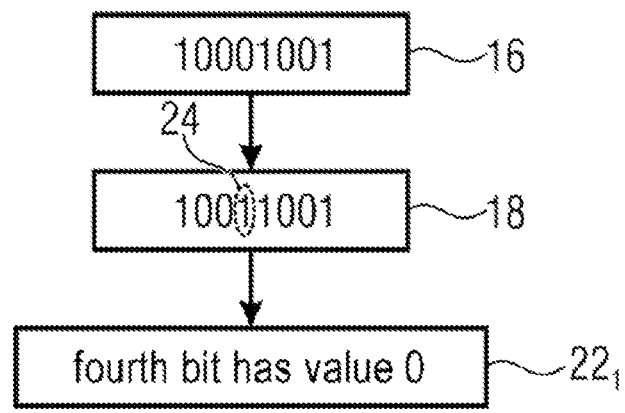
FIGS. 2a-d show schematic illustrations of different contents of error correction information in accordance with exemplary embodiments.

As is illustrated with reference to FIG. 2a, the bit sequence 16 can be represented for example as a bit sequence in accordance with "10001001", wherein any other bit sequence desired having any other length desired and/or any other content desired can also be used.

The stored bit sequence 18 has an erroneous bit 24, for example, wherein the stored bit sequence 18 can alternatively also be stored with no errors, i.e. without bit errors, with a tolerable number of bit errors and/or with a relatively high number of bit errors.

In accordance with the exemplary embodiment illustrated, the stored bit sequence 18 in the form of "10011001" is erroneous in the fourth bit from the left since the stored bit sequence 18 has a 1 there instead of the 0 compared with the bit sequence 16 to be stored. The error correction information 22$_1$ can comprise information indicating that the erroneous fourth bit has to have the value 0. This enables the interpretation-free correction of this bit error independently of possible error correcting codes (referred to as: error correction code—ECC) and/or the like.

Figure 2B:
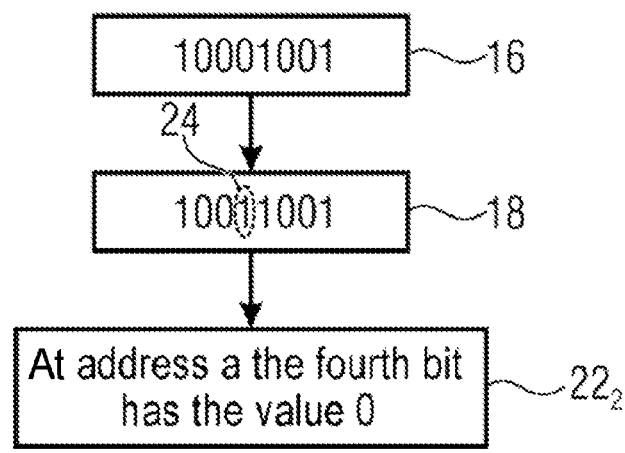

As is illustrated in FIG. 2b, the error correction information 22$_2$ can also indicate information describing that a data word stored at an address a in the electronic data memory has the value 0 in its fourth bit starting from the left and/or the most significant bit (referred to as: most significant). In this case, the address a can describe that address in the electronic data memory at which the bit sequence 18 is stored. That means that the control unit can be configured to generate the error correction information 22$_2$ such that the error correction information $22_2$ has an address of a data block in which the bit sequence 18 is stored and an indication of at least one erroneous bit 24 in the data block. In accordance with this exemplary embodiment, the error correction information $22_2$ furthermore has an indication of the correct value of the at least one erroneous bit.

This makes it possible that, with regard to a plurality or multiplicity of erroneous data words, a plurality of items of error correction information can be stored and each item of error correction information can be assigned to a specific data word in the electronic data memory.

Figure 2C:
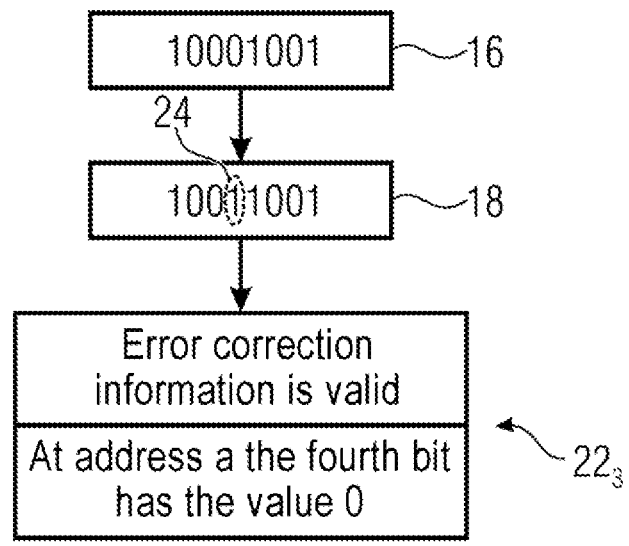

As is illustrated with reference to FIG. 2c, the control unit can be configured to generate the error correction information $22_3$ such that the error correction information $22_3$ has, as an alternative and/or in addition to other information, an indication about the validity of the error correction information $22_3$. Such an indication and/or information can be indicated for example by way of a bit and/or data field provided for this purpose. This makes it possible that resetting, reprogramming and/or erasing said bit and/or data field enables indication that the error correction information is no longer valid for the data word referenced in the error correction information $22_3$. By way of example, a different data word may have been stored at the address a and may be stored with no errors, for example. Invalidating the error correction information $22_3$ enables rapid resetting of the error correction information present with regard to the old data word.

To put it another way, by way of example, if the stored bit sequence 18 is overwritten with an updated bit sequence at the same address by the control unit, then the control unit can determine and/or ascertain that no error correction information is required for the stored updated bit sequence, for instance since no bit errors are present and/or a tolerable number of bit errors is present. The control unit can cancel the error correction information present for the stored bit sequence. Alternatively and/or additionally, the control unit can determine and/or ascertain that the stored updated bit sequence has a different bit error pattern than the stored bit sequence and can adapt the error correction information $22_3$ present for the previously stored bit sequence for the stored updated bit sequence, such that the updated error correction information is assigned to the updated stored bit sequence.

In other words: if the verification of the storage operation reveals a deviation, i.e. one or more erroneous bits are present, and no other mechanisms are employed and/or desired for correcting these bits, then error correction information can be stored in the central area and/or reserved area as follows
1. Find a suitable free entry in the central area for storing the error correction information
2. Store the error correction information If a verification of a subsequent and/or later programming operation on the same memory block no longer reveals a deviation, for example since other data were written, then the error correction information can be invalidated. If the verification reveals a different deviation than that stored in the old error correction information, for example since other data were written, then the entry can be updated. Alternatively and/or additionally, the written entry can be invalidated and a new entry can be written.

Figure 2D:
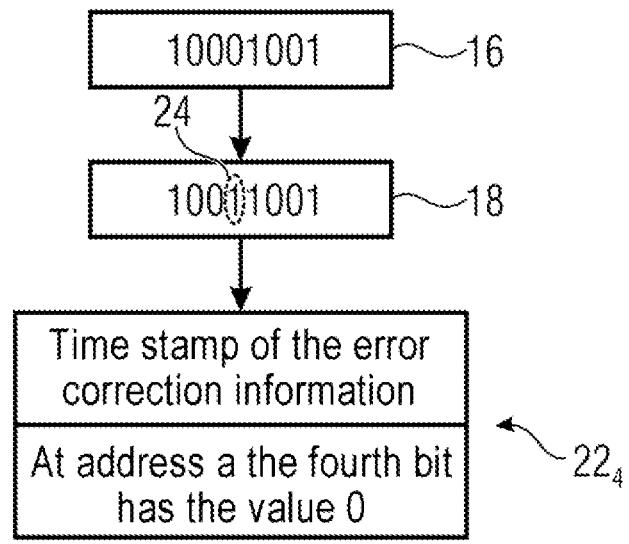

As is illustrated with reference to FIG. 2d, the error correction information $22_4$ can also contain an indication regarding a time at which the error correction information $22_4$ regarding the stored bit sequence 18 was generated and/or stored. Such information can be used by the control unit as validity information as to whether the error correction information can still be used for correcting the stored bit sequence 18.

The device 10 can be configured to check the stored bit sequence 18 within a threshold duration of time after storage. The device 10 can be configured to check the stored bit sequence 18 directly and/or immediately after the storage operation and/or shortly after storage. That means that the control unit 14 can be configured to check the stored bit sequence 18 for write errors that have occurred during and/or after the storage of the stored bit sequence. For example, the control unit can be configured to check the stored bit sequence 18 within a threshold duration of time after storage (e.g., directly after storage), i.e. directly after completion of the storage operation, for instance as a subsequent instruction and/or as a subsequent command, and/or as soon as this is permissible and/or implementable within the work sequence provided, i.e. as soon as such checking is possible in the sequence of the operations. By way of example, a write operation can be carried out for a plurality of addresses and, after the plurality of write operations, a plurality of addresses in the electronic data memory can be checked sequentially. Although the control unit 14 can also be configured to carry out the checking after a relatively long time interval, the checking within the threshold duration of time after storage (e.g., directly after storage or shortly after storage) makes it possible to compensate for endurance errors in the electronic data memory 12, which errors can bring about the majority of the bit errors, such as in the case of new types of memories.

In other words, the error correction information and/or ECC auxiliary data possibly stored in a central area of the data memory can be configured such that information is present about the erroneous bits at the time of storage. By way of example, this can comprise the address of the data block comprising the bit error. Alternatively and/or additionally, this can be effected for a number f, for a number of f erroneous bits. That means that, for a plurality of erroneous bits, a plurality of items of error correction information can be generated and stored, such that each item of error correction information is assigned to an erroneous bit and each erroneous bit is assigned an item of error correction information. Alternatively and/or additionally, an item of error correction information can also refer to a plurality of erroneous bits, for example within the same data block. The error correction information comprises for example the bit address within the block, i.e. an indication which enables the bit to be identified. The error correction information comprises the correct value of the erroneous bit. In some examples, information, for instance at least one bit, describing the entry of the error correction information as valid can be present. The error correction information can itself in turn be protected by an error correcting code, for example on the same basis on which the other data stored in the normal data area are coded. That is to say that the error correcting code can have recursively in turn error correction information for an item of error correction information.

Figure 3:
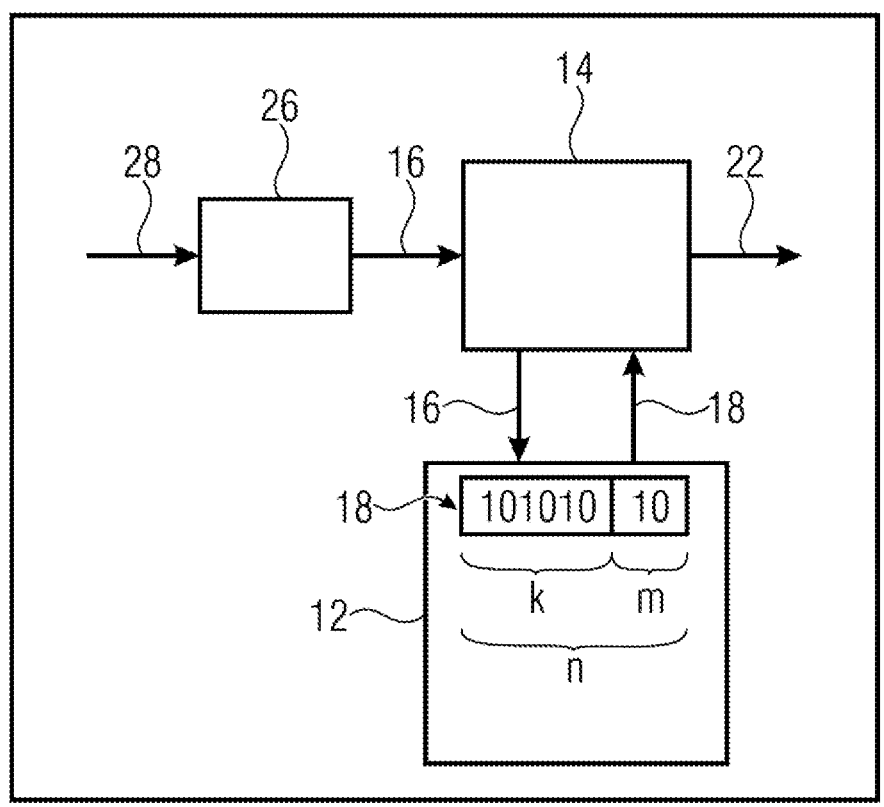
FIG. 3 shows a schematic block diagram of a device in accordance with one exemplary embodiment which comprises a coder.

FIG. 3 shows a schematic block diagram of a device 30 in accordance with one exemplary embodiment. The device 30 comprises a coder 26 configured to determine and/or obtain a bit sequence 28 to be processed and/or coded. The coder 26 is configured to code the bit sequence 28 using a code to determine and/or obtain a coded bit sequence. The coded bit sequence can be the bit sequence 16, for example. The control unit 14 can be configured to obtain the coded bit sequence from the coder 26 and to store it in the electronic data memory 12 in order thus to determine and/or obtain the stored bit sequence 18. The stored bit sequence 18 can have a bit length of n bits, wherein the n bits can include a number of k data bits and can include a number of m additional bits, which were generated and/or added by the use of the code in the coder 26. In some examples, the coder 26 can be configured to select the code for correcting a correction number of bit errors and/or detecting a detection number of bit errors. By way of example, the coder 26 can be configured to select and/or implement an error correcting code, such that, as a result of its use, the correction number of bit errors can be corrected and the detection number of bit errors can be detected. The detection number of bit errors can be greater than the correction number of bit errors. By way of example, as a result of the use of the code, at least one bit error can be correctable and at least two bit errors can be detectable, at least two bit errors can be correctable and at least three or at least four bit errors can be detectable and/or the like.

The control unit 14 can be configured to determine the error correction information 22 for the stored bit sequence 18 comprising k data bits and m error correction bits. In some examples, a number of bit errors in the stored bit sequence 18 may be determined. The error correction information 22 may not be stored responsive to the number of bit errors being less than a bit error threshold value. Alternatively and/or additionally, the error correction information 22 may be stored responsive to the number of bit errors being equal to and/or greater than the bit error threshold value.

Figure 4:
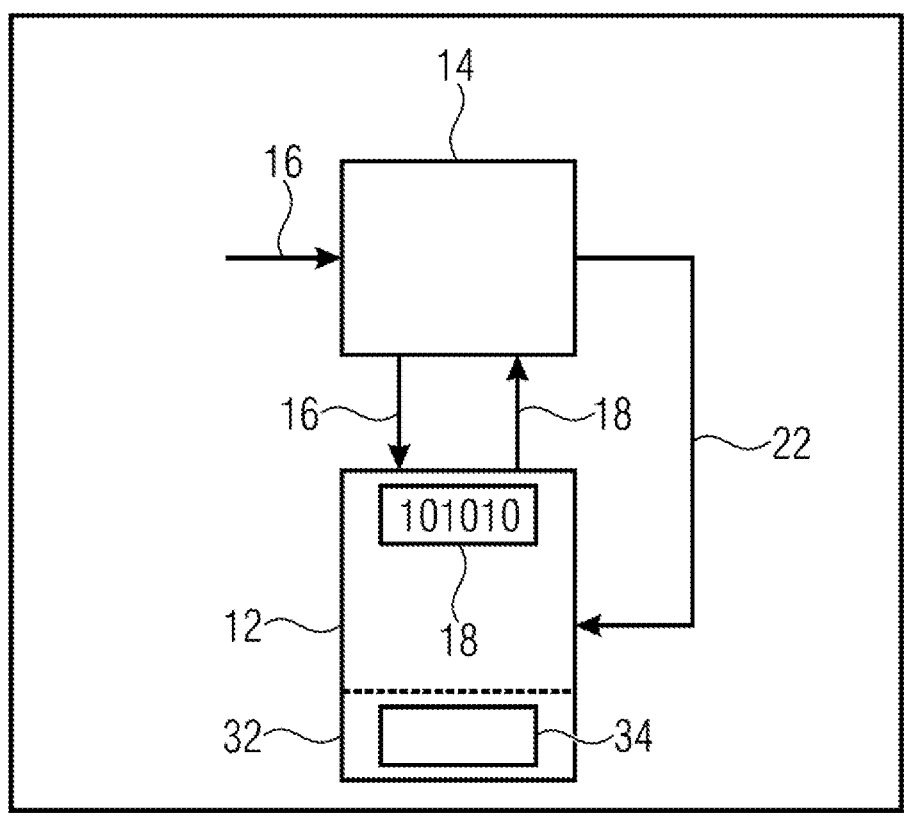
FIG. 4 shows a schematic block diagram of a device in accordance with one exemplary embodiment in which a control unit is configured to store the error correction information in an electronic data memory.

FIG. 4 shows a schematic block diagram of a device 40 in accordance with one exemplary embodiment, wherein the control unit 14 is configured to store the error correction information 22 in the electronic data memory 12. The device 40 can store the error correction information 22 at any desired address in the electronic data memory 12. In accordance with one exemplary embodiment, the control unit 14 is configured to store the error correction information 22 in an area 32 of the electronic data memory 12 that is reserved for the error correction information. Since items of error correction information have to be stored in the electronic data memory 12 comparatively infrequently, if for example a frequency of write operations for normal user data with a low error rate is referenced, this makes possible a comparatively low frequency of write operations in the reserved area 32 and thus a low probability of fatigue phenomena in memory cells therein, such that the reserved area 32 can have a high reliability over the service life of the electronic data memory 12, which is advantageous for the storage of the error correction information 22.

The control unit 14 can be configured to convert the error correction information 22 into an error correction bit sequence 34 and to store the error correction bit sequence 34 and/or a bit sequence derived based on (and/or derived from) the error correction bit sequence 34 as a second bit sequence to be stored in the electronic data memory. By way of example, the bit sequence generated from the error correction information 22 can be coded using an error correcting code, a compression can be effected and/or some other data processing can be carried out.

Figure 5:
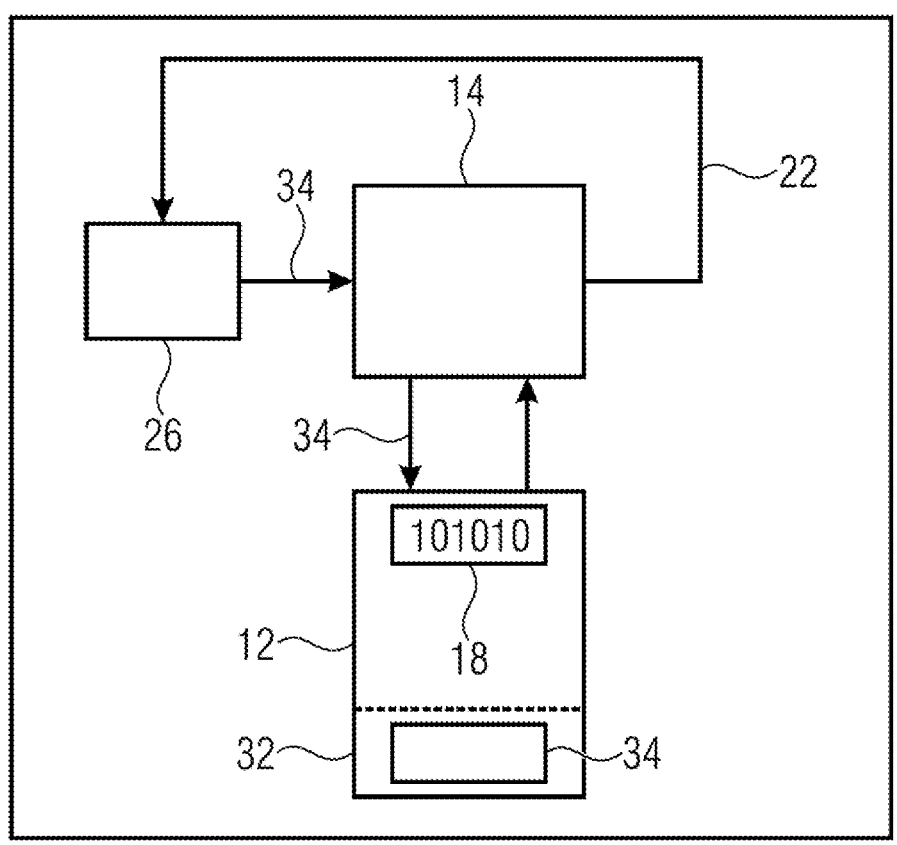
FIG. 5 shows a schematic block diagram of a device in accordance with one exemplary embodiment in which the control unit is configured to provide the coder with the error correction information and/or a bit sequence derived therefrom.

FIG. 5 shows a schematic block diagram of a device 50 in accordance with one exemplary embodiment. The device 50 comprises the coder 26, wherein the control unit 14 is configured to provide the coder 26 with the error correction information 22 and/or a bit sequence derived based on (and/or derived from) the error correction information 22. The coder 26 is configured to generate the error correction bit sequence 34 from the error correction information 22, that is to say that the error correction bit sequence 34 can be a coded bit sequence comprising additional bits for error correction. The control unit 14 can be configured to store the error correction bit sequence 34 in the data memory 12, for example the reserved area 32. In accordance with one exemplary embodiment, the control unit 14 is configured to check the error correction bit sequence stored in the data memory 12 for write errors, as has been described for the stored bit sequence 18 on which the error correction bit sequence 34 is based.

Although the exemplary embodiments described above have been described such that the error correction information is generated following a write operation, in accordance with exemplary embodiments alternatively and/or additionally provision is made for the control unit to be configured to read one or more stored bit sequences from the electronic data memory 12, for instance in the course of a read access for obtaining data for the further processing and/or in the course of routine checking. The control unit can be configured, in the course thereof, to check the stored bit sequence for bit errors, for instance using an error correcting code with which the bit sequence is coded, and to generate error correction information on the basis thereof. The control unit can be configured to store the error correction information obtained in this way for later use and/or to use the error correction information to update error correction information that already exists, i.e. has already been stored, for the stored bit sequence.

Figure 6:
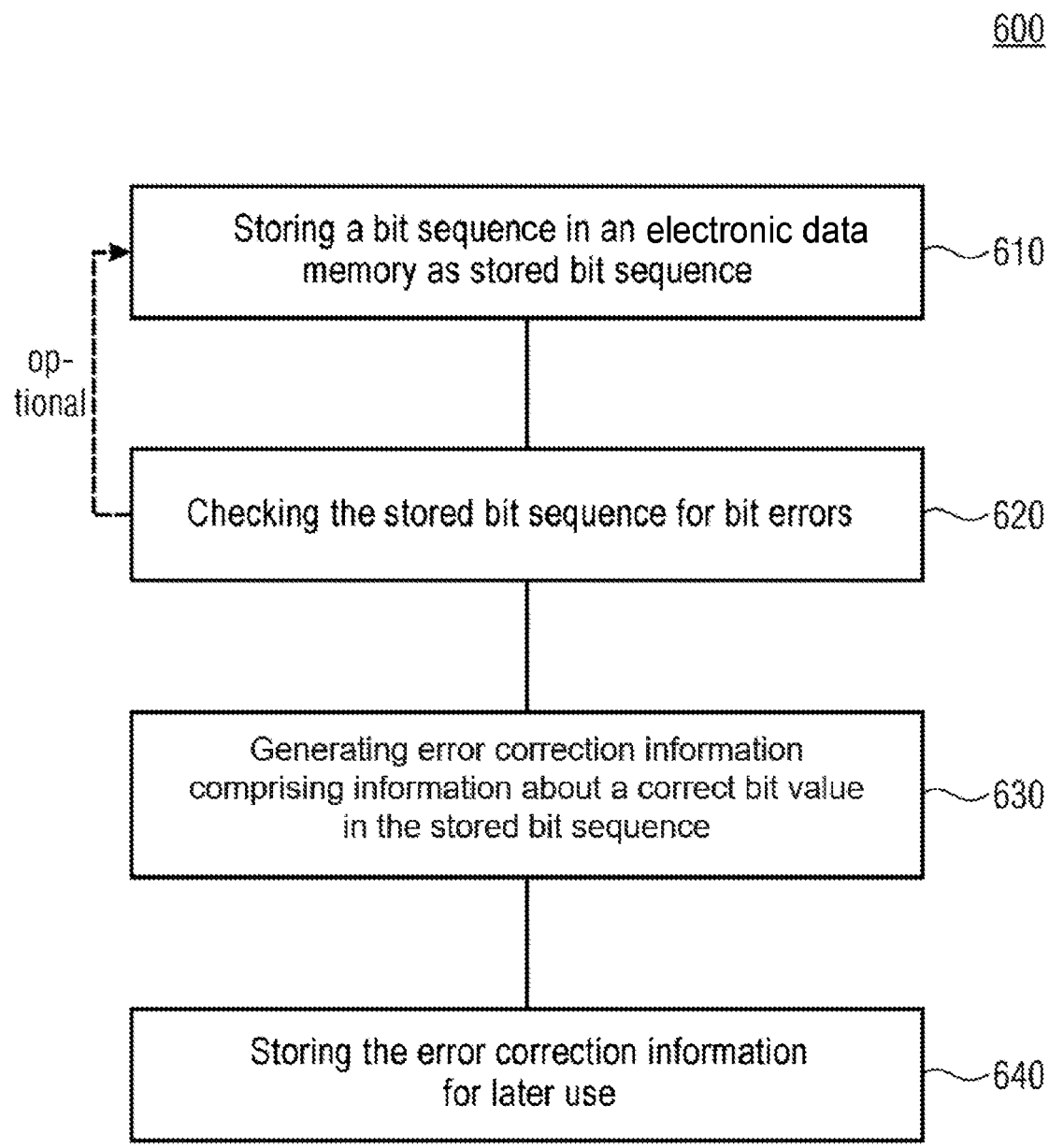
FIG. 6 shows a schematic flow diagram of a method in accordance with one exemplary embodiment.

FIG. 6 shows a schematic flow diagram of a method 600 in accordance with one exemplary embodiment. An act 610 comprises storing a bit sequence in an electronic data memory as a stored bit sequence. An act 620 comprises checking the stored bit sequence for bit errors. An act 630 comprises generating error correction information comprising information about a correct bit value in the stored bit sequence. An act 640 comprises storing the error correction information for later use.

The method 600 can be implemented wholly or partly in software and/or wholly or partly in hardware; by way of example, the control unit 14 can be correspondingly designed for the implementation.

If at least one bit error is determined and/or ascertained in act 620, such as within a threshold duration of time after (e.g., directly after) the storage operation in act 610, then the method 600 can, in some examples, be implemented such that the bit sequence is stored again in the electronic data memory in at least one repetition, that is to say that act 610 and subsequently act 620 can be carried out again (e.g., the storing the bit sequence in the electronic data memory may be repeated). The method 600 can be configured such that the error correction information is stored for the later use in act 640 if a number of repetitions (of the repeating the storing the bit sequence in the electronic data memory) has reached and/or exceeded a repetition threshold value. In this regard, the method 600 and/or a corresponding configuration of the control unit 14 can be configured such that a number of one repetition, two repetitions and/or three repetitions and/or even more repetitions is provided and, in the event of one or more bit errors being determined and/or ascertained in the act 620, act 610 is carried out again as long as the maximum number of write operations, i.e. the repetition threshold value, has not yet been reached. Alternatively and/or additionally there is the possibility of configuring the repetition threshold value in dynamic fashion and for example carrying out a repetition of acts 610 and/or 620 as long as the renewed write operation in act 610 leads to an improvement of the result, i.e. to a reduced number of bit errors determined and/or ascertained in act 620.

Figure 7:
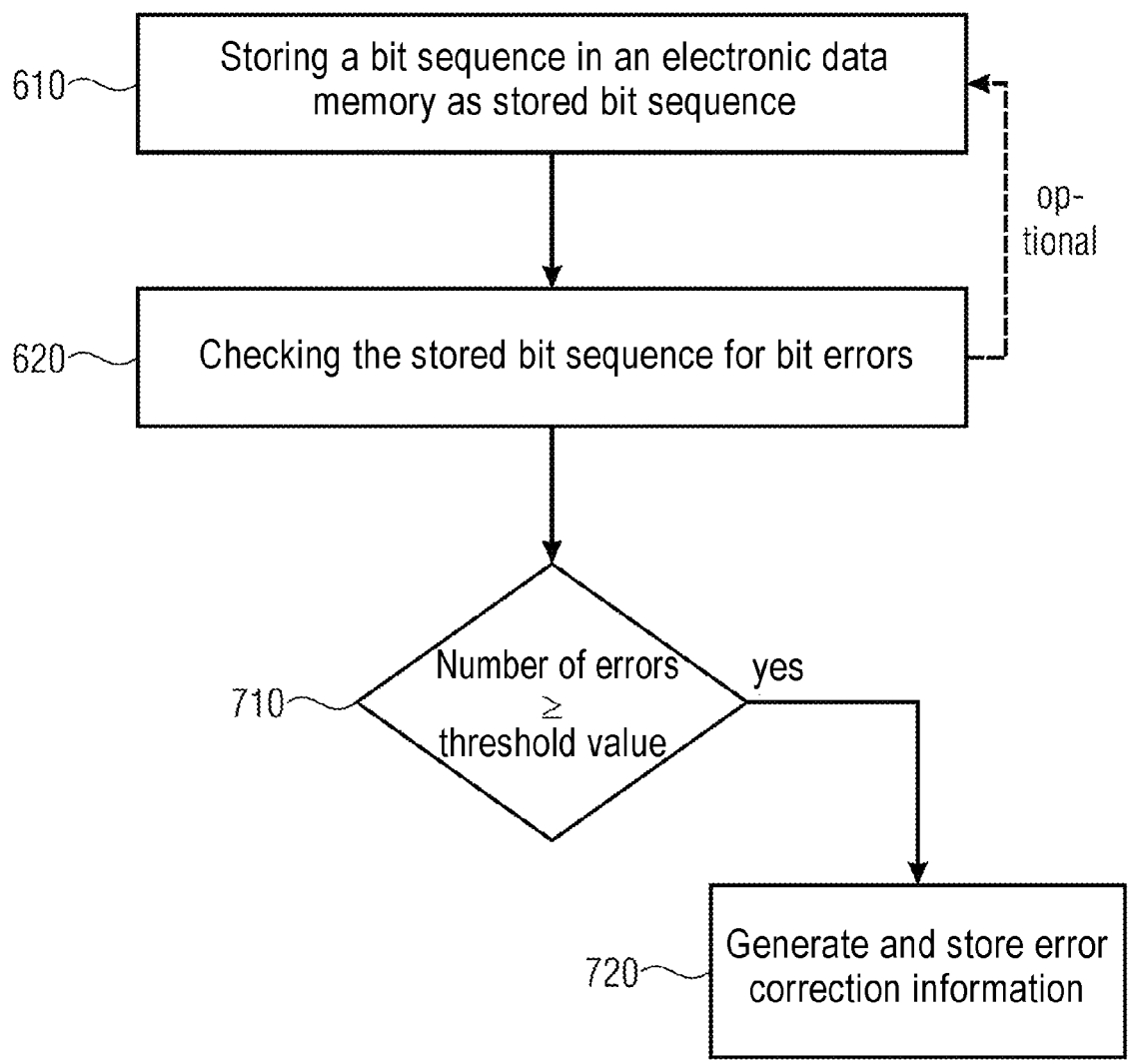
FIG. 7 shows a schematic flow diagram of a method in accordance with one exemplary embodiment in which the number of determined, ascertained and/or residual bit errors is compared with a bit error threshold value.

FIG. 7 shows a schematic flow diagram of a method 700 in accordance with one exemplary embodiment, which can comprise acts 610 and 620 of the method 600. In some examples, act 610 and/or act 620 can be carried out repeatedly, as has been described in association with the method 600.

After act 620 and/or the last performance thereof, the method 700 comprises a comparison 710, wherein the number of bit errors that have remained and/or been determined and/or ascertained in act 620 is compared with a bit error threshold value. For the case where the number of determined and/or ascertained bit errors is greater than or equal to the bit error threshold value, alternatively greater than the bit error threshold value, then in accordance with the method 700 an act 720 is carried out, comprising generating and storing the error correction information. For example, responsive to a determination that the number of determined and/or ascertained bit errors is greater than or equal to the bit error threshold value, the act 720 may be carried out. This can be obtained by carrying out acts 630 and 640 of the method 600. If the number of bit errors is less than (e.g., falls below) the bit error threshold value, the method 700 is configured such that the error correction information is not stored for the later use. Control units in accordance with exemplary embodiments described herein can be configured for carrying out the method 700. That means that the error correction information is not necessarily generated for every number of bit errors, such as not for a small number of bit errors (e.g., a number of bit errors less than a threshold number of bit errors). For example, the bit error threshold value can be chosen depending on an error correcting code used. The bit error threshold value can for example be greater than 0 and be less than the correction number of bit errors or maximally equal to the correction number of bit errors which can be corrected by means of the error correcting code. If the error correcting code is designed for example to correct a number of two bit errors, then the bit error threshold value can be chosen for example as 1 and/or 2.

If the error correcting code is designed for example to correct a number of three bit errors, then the error correction threshold value can be for example 1, 2 and/or 3. This can be advantageous such as in the case of electronic data memories that are insusceptible to data retention errors (referred to as: retention related failures).

Figure 8A:
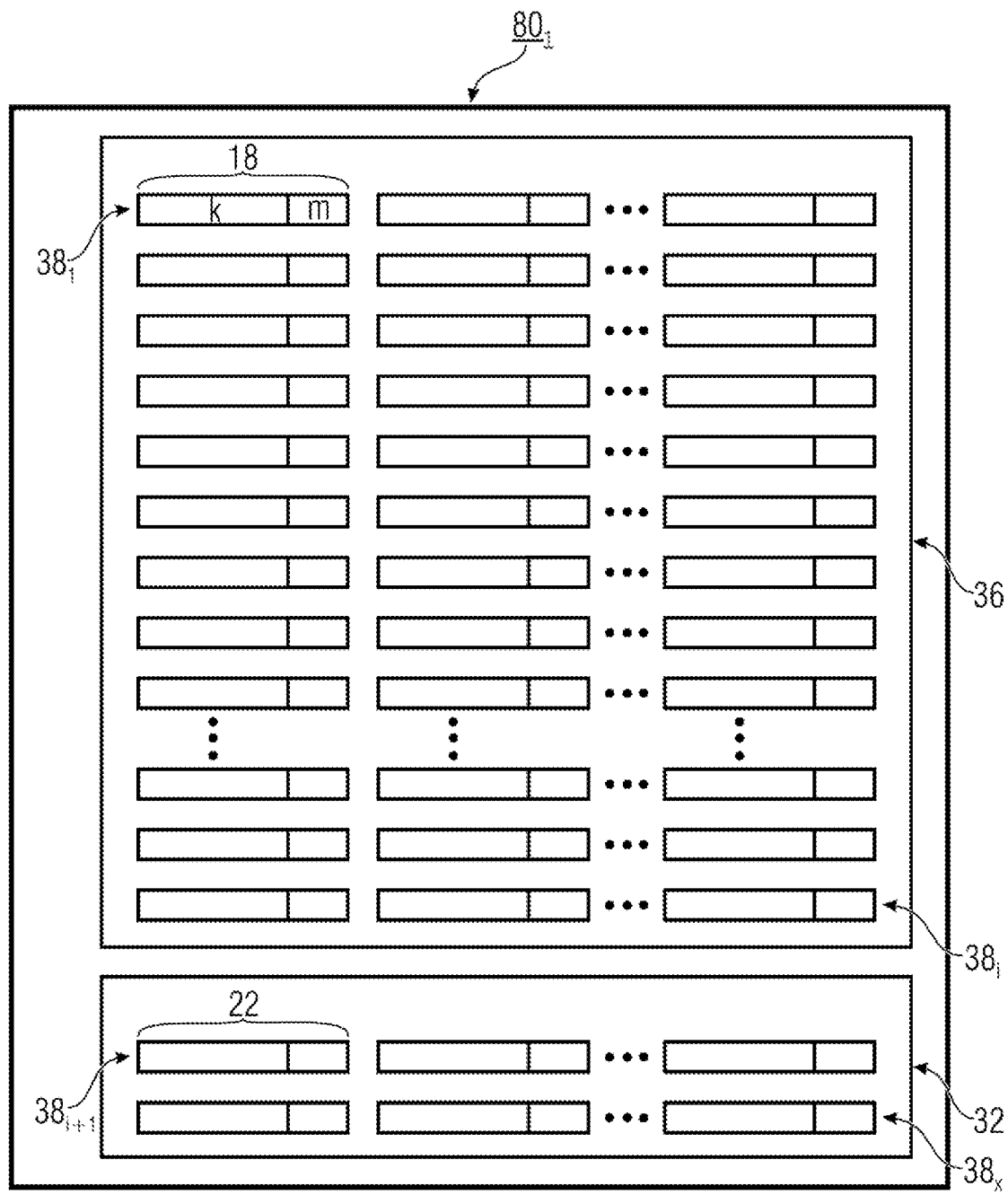
FIG. 8a shows a schematic block diagram of an electronic data memory which can be used for example as electronic data memory in a device described herein.

FIG. 8*a* shows a schematic block diagram of an electronic data memory 80$_1$, which can be used for example as electronic data memory 12 in a device described herein. The electronic data memory 80$_1$ can comprise a regular data area 36 and the reserved area 32. A number of addressable memory blocks 38 in the reserved area 32 can be based on an expected number of endurance errors of memory cells of the data area 36 of the electronic data memory 80$_1$, for example 1 out of 10,000, 1 out of 100,000 and/or 1 out of 1,000,000.

The areas 32 and 36 can each comprise blocks 38 of identical size and/or of mutually different sizes, wherein each block can comprise a group of memory cells. A respective group of memory cells in a data block 38 can store in each case at least one portion of the stored bit sequence 18, wherein the stored bit sequence can have k data bits and, in some examples, m error correction bits, as has been described in association with FIG. 3. Each of the data blocks 38 can be accessed using a data memory address for a read and/or write access. By way of example, firmware, code and/or user data can be stored in the regular data area 36. This can encompass data which are overwritten with a certain regularity and/or frequency, with the result that the memory cells can be correspondingly burdened. The use of the reserved area 32 makes it possible for the error correction information 22 to be stored such that a comparatively infrequent write access to these memory cells takes place, such that comparatively negligible fatigue phenomena can be expected, which increases the reliability of the error correction information 22.

Figure 8B:
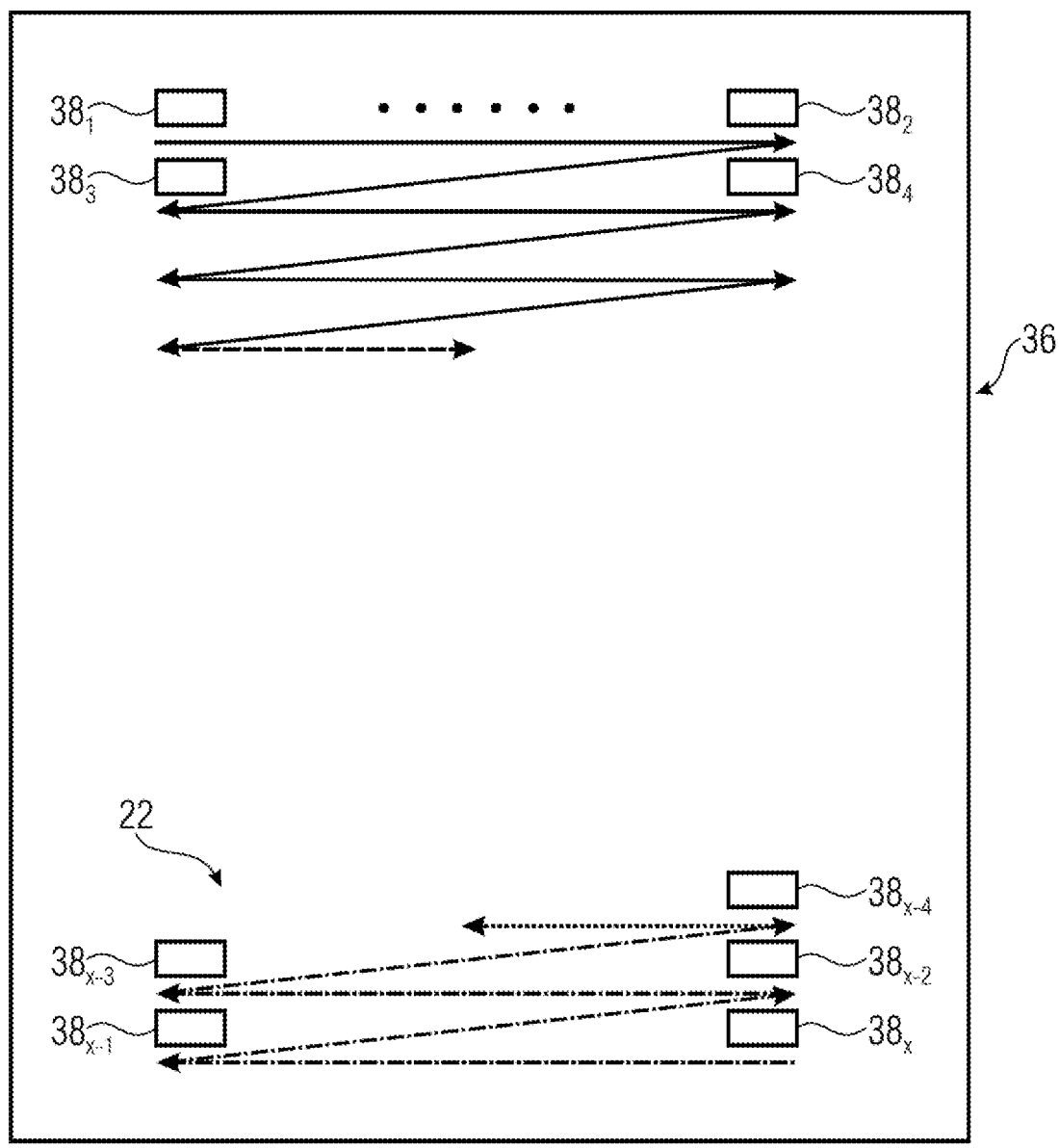
FIG. 8b shows a schematic block diagram of an electronic data memory in which both the regular data and/or items of information and the items of error correction information are stored in a regular data area.

FIG. 8*b* shows a schematic block diagram of an electronic data memory 80$_2$, wherein both the regular data and/or information and the error correction information are stored in the regular data area 36. By way of example, the control unit can be designed to store new and/or additional data in each case in a first free data block 38. The blocks 38 are provided with indices 1, . . . , 4, . . . , x–4, . . . , x, wherein for example ascending indices can denote ascending addresses in the electronic data memory 38$_2$. The control unit can be configured to address in each case the lowest address (lowest index) of a block 38 which is free and/or usable for the write operation. In the course of operation, writing can thus lead from the block 38$_1$ toward the block 38$_2$ toward the block 38$_3$ and toward the block 38$_4$, wherein in each case a multiplicity of further blocks 38 can be arranged between the blocks 38$_1$ and 38$_2$ and respectively 38$_3$ and 38$_4$, as is illustrated for example for the data block 80$_1$.

The error correction information can be stored simultaneously starting from a highest memory address in the electronic data memory, wherein each new item of error correction information can be stored in the next free block 38 comprising the next lower free address (index).

This makes it possible to separate the regular data and the error correction information 22 as long as the electronic data memory 80$_2$ has at least one empty block 38.

A control unit that addresses the electronic data memory 80$_2$ can be configured to determine and/or obtain a plurality of bit sequences for storage in the electronic data memory, wherein this can comprise reception from outside and/or a self-generated bit sequence. The control unit can be configured to store each of the plurality of bit sequences at an address in the electronic data memory 80$_2$, such that the plurality of bit sequences is stored in accordance with a bit sequence address order in the electronic data memory. The control unit can determine, for the plurality of bit sequences, in each case an assigned item of error correction information, provided that a stored bit sequence has errors. The possibly plurality of items of error correction information can likewise be stored at an address in the electronic data memory, such that the plurality of items of error correction information is stored in accordance with an error correction address order, opposite to the bit sequence address order, in the electronic data memory, as is indicated on the basis of the opposite arrow directions. Although FIG. 8*b* has been described such that the regular data are stored with an ascending address order and the error correction information is stored with a descending address order, any other mutually differentiable scheme is also possible, for example storing the items of error correction information with an ascending address order and the regular data with a descending address order.

In other words: if an endurance error is determined and/or ascertained after the programming of the memory cells, additional information, the error correction information, can be stored in a central area comprising information about the endurance error. If, later, a corresponding data block is read and an uncorrectable data error is determined and/or ascertained (or alternatively depending on whether a data error is determined and/or ascertained at all, and/or alternatively entirely independently of whether a data error is detected), then the error correction information is used firstly to correct the erroneous bits which were known upon the creation of the error correction information and had already arisen at the time of storage. This makes it possible for the ECC to correct the remaining bit errors, which are data retention errors, for example. As a result, the reliability is possibly drastically increased, without the ratio m/k being increased. Memory space is merely used for the error correction information.

Now that the generation and storage of the error correction information has been described above, reference is made below to the use of the error correction information.

Figure 9:
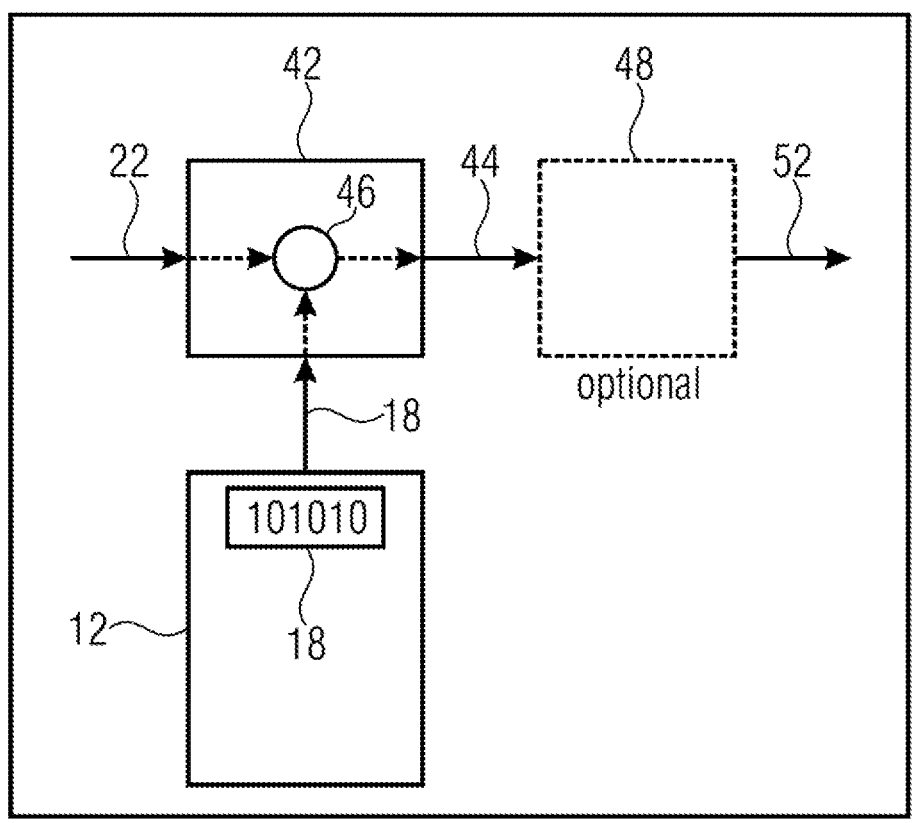
FIG. 9 shows a schematic block diagram of a device in accordance with one exemplary embodiment which is designed to use the error correction information.

FIG. 9 shows a schematic block diagram of a device 90 in accordance with one exemplary embodiment, which is designed to use the error correction information. The device 90 can be an autonomous independent device, but can also be one of the devices 10, 30, 40 and/or 50, augmented by a corresponding functionality.

The device 90 comprises the electronic data memory 12 comprising the stored bit sequence 18. The device 90 comprises a control unit 42 configured to determine and/or obtain stored error correction information 22 assigned to the stored bit sequence 18. For this purpose, the device 90 can comprise a corresponding interface. Alternatively and/or additionally, the device 90 can comprise a data memory in which the stored error correction information 22 is stored. In accordance with one exemplary embodiment, the stored error correction information 22 is stored in the electronic data memory 12, as described in association with previous exemplary embodiments. The control unit 42 is configured at least partly to correct the stored bit sequence 18 using the error correction information to determine and/or obtain a corrected bit sequence 44. As described in association with FIGS. 2a to 2d, the error correction information has an indication about an erroneous bit and/or about a correct bit value in the stored bit sequence 18. That means that the bit error indicated in the stored error correction information 22 can be corrected directly by an information combiner 46, which combines said information and/or indication about a correct bit value with the stored bit sequence 18.

The device 90 can comprise, in some examples, error corrector 48, the functionality of which can also be implemented in the control unit 42 and/or 12. The error corrector 48 can be configured to decode the corrected bit sequence 44 using a code with which the bit sequence 18 is coded, and thus to correct one or more residual bit errors in the corrected bit sequence. Depending on the viewpoint, the error correction capacity of an error correcting code can thus be increased since this code only has to correct the bit errors not already determined and/or ascertained during storage. From a different viewpoint, alternatively and/or additionally, the error correcting code can be implemented with a lower error correcting property and the absolute error correction capacity can simultaneously be maintained since the error correcting code only has to detect those errors which are not directly assigned to the storage and are assigned for example to the data retention errors. A configuration of the error correcting code with a small number of error correction possibilities (e.g., a number of error correction possibilities less than a threshold number of error correction possibilities) makes it possible for data blocks 38 to be made comparatively small since only a small number of additional memory cells (e.g., a number of additional memory cells less than a threshold number of additional memory cells) have to be provided for the error correcting code. This therefore makes possible—for theoretically the same number of memory cells—a higher number of stored words in the electronic data memory.

The error corrector 48 can be configured to provide a bit sequence 52 corrected further, in which both the bit errors indicated in the stored error correction information 22 and the bit errors corrected by the error correcting code are corrected.

The device 90 can be configured, upon the device being started up, switched on and/or activated, to load available error correction information for the electronic data memory 12, for example into a volatile memory, for instance a RAM memory and/or a register.

Figure 10:
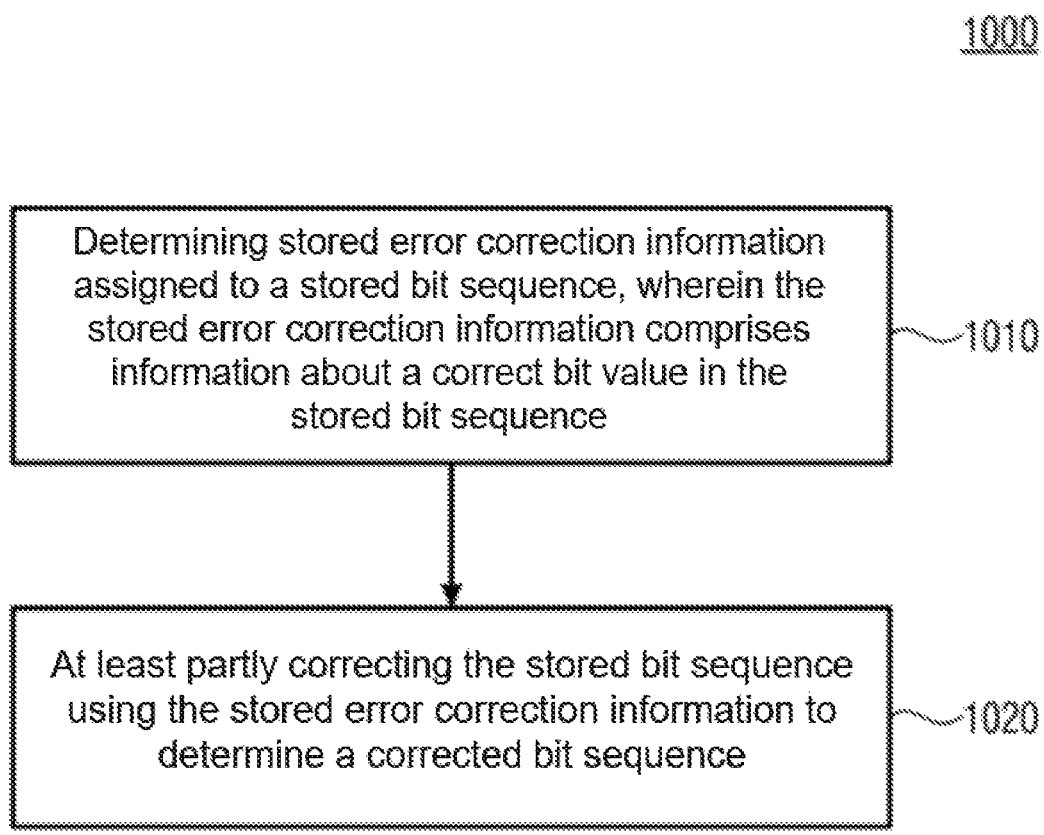
FIG. 10 shows a schematic flow diagram of a method in accordance with one exemplary embodiment which can be carried out for example by the device from FIG. 9.

FIG. 10 shows a schematic flow diagram of a method 1000, which can be carried out for example by the device 90. An act 1010 comprises determining and/or obtaining error correction information (e.g., stored error correction information) assigned to a stored bit sequence, where the error correction information comprises information about a correct bit value in the stored bit sequence. That is to say that the error correction information is assigned to the stored bit sequence. An act 1020 comprises at least partly correcting the stored bit sequence using the error correction information to determine and/or obtain a corrected bit sequence.

Figure 11:
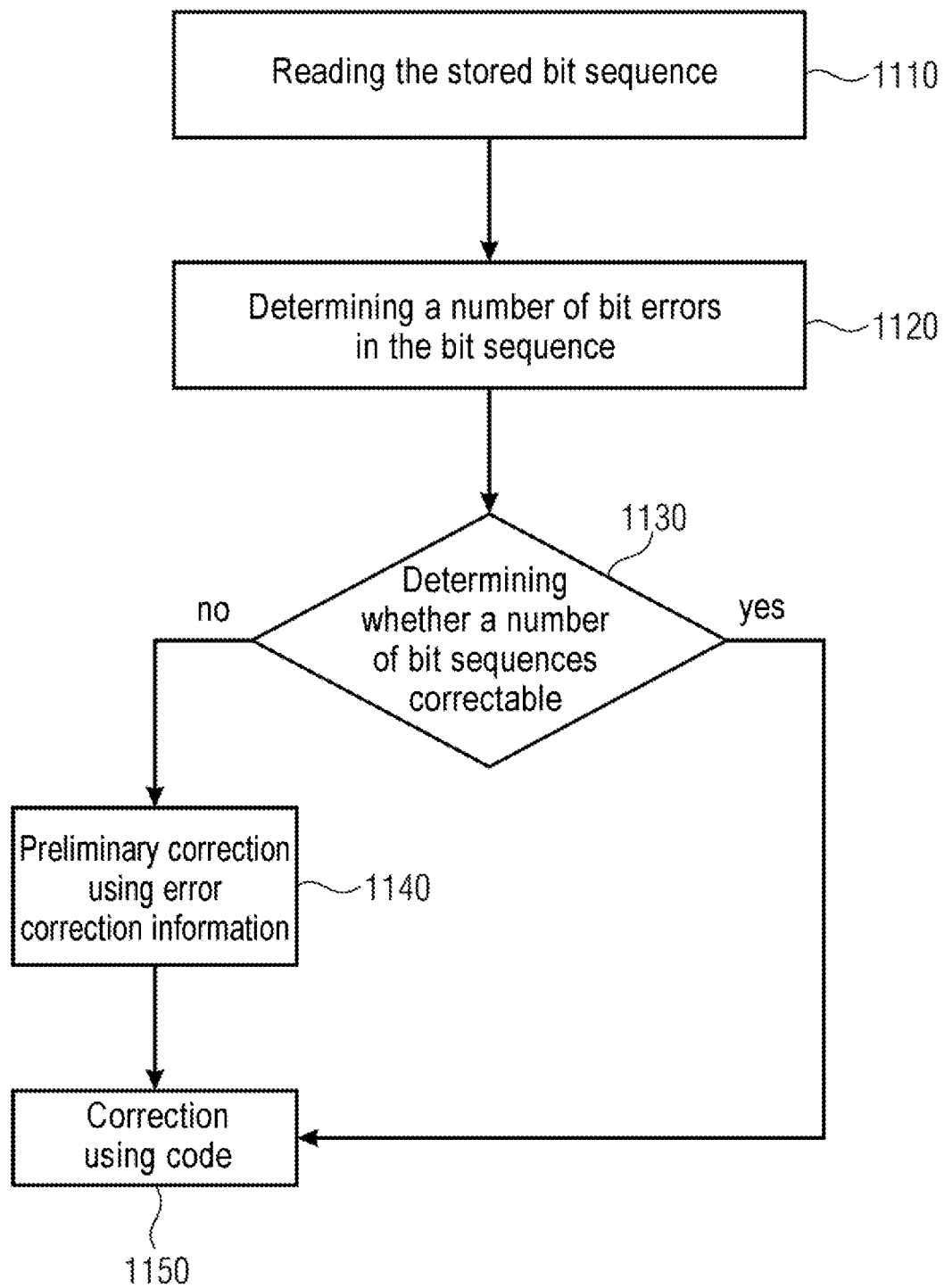
FIG. 11 shows a schematic flow diagram of a method in accordance with one exemplary embodiment which comprises reading a stored bit sequence.

FIG. 11 shows a schematic flow diagram of a method 1100 in accordance with one exemplary embodiment. An act 1110 involves reading the stored bit sequence, for instance from the electronic data memory 12.

An act 1120 involves determining a number of bit errors. This can be done for example using an error correcting code designed to detect a specific number of bit errors of the stored bit sequence 18.

A decision 1130 involves determining whether the number of bit errors determined and/or ascertained in act 1120 can be corrected by means of the code. If this is not the case (option to "no"), for example, then a preliminary correction using the error correction information can be carried out in an act 1140, for example by carrying out the method 1000. As a result, bit errors known beforehand can already be reduced and an at least partly corrected bit sequence can thus possibly be determined and/or obtained, for instance the bit sequence 44, with the number of bit errors reduced. This can make it possible that the error correcting code, using the precorrected bit sequence, is able to correct the remaining bit errors.

If it is determined and/or ascertained in the decision 1130 that the code is suitable for correcting the determined and/or ascertained number of bit errors (option "yes"), then proceeding from the decision 1130 it is possible to switch directly to act 1150, which can be implemented for example by the error corrector 48.

That means that a control unit can be configured to read from the electronic data memory a stored bit sequence coded based on and/or on the basis of a code for detecting and correcting bit errors. The control unit can be configured to determine whether a number of bit errors in the stored bit sequence exceeds a correction possibility of the code and, for the case where the number of bit errors exceeds the error correction possibility of the code, to determine and/or obtain a first corrected bit sequence from the stored bit sequence using the error correction information, and to correct the first corrected bit sequence further using the code. For example, the control unit can be configured to determine and/or obtain the first corrected bit sequence based on the stored bit sequence using the error correction information and to correct the first corrected bit sequence using the code responsive to a determination that the number of bit errors exceeds the error correction possibility of the code. For the case where the number of bit errors does not exceed the error correction possibility of the code, the control unit can correct the stored bit sequence using the code and without using the error correction information. This can result in a saving of read operations for determining and/or obtaining the error correction information. For example, the control unit can be configured to correct the stored bit sequence using the code without using the error correction information responsive to a determination that the number of bit errors does not exceed the error correction possibility of the code.

Exemplary embodiments comprising the use of an error correcting code enable an improved utilization of the error correcting code, such as with regard to nonvolatile memories, for instance resistive RAMs. The improvements can be seen in a low overhead for error correcting codes since only the errors assigned to data retention have to be corrected, while fatigue errors and/or endurance errors (referred to as: endurance related failures) can be corrected beforehand based on and/or on the basis of the error correction information. This makes possible a small chip surface area (e.g., a chip surface area smaller than a threshold chip surface area) with the reliability of the memory remaining the same and/or a higher capability for error correction with additional outlay remaining almost the same. This, too, makes it possible to reduce the failure rate of nonvolatile memories. Alternatively and/or additionally, an increased endurance of the nonvolatile memories can also be obtained.

Some of the exemplary embodiments described herein use error correcting codes. Error correcting codes, as described in association with FIG. 3, can extend a block of information that has k data bits to a number of n bits by adding m=n-k check bits and/or error correction bits. The ratio of m/k indicates the additional outlay for implementing the error correcting code since it indicates the additional outlay for storing the additional correction bits in the memory. An additional factor is the logic for generating and checking the error correction bits, but this can be disregarded in the context of the exemplary embodiments described herein.

The choice of m and k can specify the boundary conditions of the error correcting code. Exemplary properties of an error correcting code are correction of a single error and detection of a single error, that is to say that exactly one defective bit of the n-bit can be detected and corrected. Two or more defective bits exceed the capabilities of the code. Alternatively and/or additionally, error correcting codes for correcting a single error and for detecting two bit errors are implementable (referred to as: single error correcting and double bit detecting—SECDED), wherein two erroneous bits can be detected and one erroneous bit can be detected and corrected. Three or more erroneous bits exceed the capabilities of the code. Double error detection and double error correction can also be implemented, and/or double error correction and triple bit error detection (referred to as: double error correcting and triple bit detecting—DECTED).

Additional and/or other code properties can likewise be implemented. The more demanding the required correction properties, the higher, for a given data block size k, the ratio m/k can become, that is to say that the efficiency of the data memory decreases. The required correction properties can be defined on the basis of the total storage capacity of the data memory (x information blocks each having k bits), the total failure rate of the nonvolatile data memory, the failure of each individual bit, which can in turn be influenced by the physical properties of the technology respectively used, the use profile of the data memory, for instance whether the data are stored for y years (data retention) and/or whether a number of z change cycles (endurance) are intended to be implemented and/or the environmental profile of the use, such as temperature profiles during use and/or storage.

The more demanding the requirements in their entirety, the higher the error correcting properties, and thus the additional outlay, of the error correcting code can be chosen to be. Exemplary embodiments take account of the insight that failures in an electronic data memory do not affect all bits of a data block in the same way, rather that the "weakest" bits fail first, and so overall a failure rate, that is to say an error probability, is obtained, and not necessarily a functional limit.

One insight of the exemplary embodiments described herein is to differentiate between different types of errors that lead to bit error rates, which enables an efficient implementation of error correcting codes through to omission thereof. Roughly speaking bit errors can be subdivided into data retention errors (referred to as: retention related failures) and endurance errors (referred to as: endurance related failures). Data retention errors often do not become visible until after an in some instances long waiting time. By contrast, endurance errors can already be determinable and/or ascertainable within a threshold duration of time after (e.g., directly after) the storage of the data, i.e. the programming of the memory. An endurance error can be detected by a verification operation being carried out within a threshold duration of time after (e.g., directly after) the programming process. The verification operation can compare the expected data (bit sequence which should be written) with the data that were read from the memory, and can, in some examples, take account of read tolerances, for example read operations with adapted read conditions having a certain latitude with respect to normal and/or expected read conditions, as described in association with FIG. 1. Such a procedure can be referred to as margin read (safety read) and a shift of the possibly analog decision threshold between two decision intervals, for instance 0 and 1, can be determined and/or obtained. It is thus possible to shift the decision threshold for differentiating a logic state of a read bit. For this purpose, for example, the reference read voltage, the reference current and/or some other variable can be altered in order to produce a separation with respect to the decision threshold used later during normal reading.

The endurance errors are considered in the context of the present exemplary embodiments. In many applications it is not known what part of a data memory has to have a high endurance. At the same time, typically only a relatively small part of the memory area is written to/programmed often (e.g., a part of the memory area that is written to and/or programmed may be less than a threshold proportion of the memory area). By way of example, code is changed infrequently, while data and/or user data can at least potentially be changed often. During the production of a corresponding device, for example as a smart card, however, it is not known how the later user will use the memory capacity. Configuring all memory blocks with an error correcting code directed to the worst case means that a possibly unnecessarily high additional outlay is used for the implementation of the ratio m/k. Exemplary embodiments avoid such configurations since the endurance errors can be considered separately by virtue of the error correction information. Instead of designing the error correcting code in such a way that the worst case of all data failures is covered, it is possible to calculate the number of ECC bits m per block for one, some and/or all of the x blocks in such a way that the proportion of the endurance errors is reduced and/or even ignored.

In accordance with one embodiment, a set of actions (e.g., a sequence of actions) can be implemented as follows
1. Read data from the memory block
2. Check error correcting code of the memory block
3. If the data are good and/or at least correctable, then output these (insofar as necessary corrected) data, otherwise
4. If assigned error correction information is available (in the electronic data memory and/or a cache, RAM and/or register), then
   carry out a precorrection of the bits in the read data, using the error correction information, and start once again the attempt at error correction by means of an error correcting code
5. If data are now good and/or at least correctable, then output these (insofar as necessary corrected) data, otherwise output error indication that data are uncorrectable.

In order for the concept to work reliably in act 3 of the set of actions, the error correcting code can be chosen in such a way that the detection number of bit errors (detection capability) has at least one additional bit compared with the correction number of bit errors (correction capability), for example SECDED and/or DECTED.

In accordance with an alternative embodiment, the method can also be configured as follows
1. Read data from the memory block
2. Check error correcting code of the memory block
3. If the data are good and/or contain at least a defined maximum (and correctable) number of bit errors, then output these (insofar as necessary corrected) data, otherwise
4. If assigned error correction information is available (in the electronic data memory and/or a cache, RAM and/or register), then
   carry out a precorrection of the bits in the read data, using the error correction information, and start once again the attempt at error correction by means of an error correcting code
5. If data are now good and/or at least correctable, then output these (insofar as necessary corrected) data, otherwise output error indication that data are uncorrectable.

In this embodiment, detection number of bit errors and correction number of bit errors of the error correcting code can be identical. In accordance with one exemplary embodiment, given a specific correction number of bit errors, for instance 3, a reserve is generated and the evaluation of the error correction information is dispensed with, e.g., up to a number of detected errors that is lower than said correction number of bit errors, for instance 1 and/or 2. In the case of maximum errors that are actually still correctable, that is to say e.g., three errors, the error correction information can already be accessed for the sake of safety. That is to say that, for the case where the number of bit errors corresponds to the (maximum) error correction possibility of the code, the control unit can determine and/or obtain a first corrected bit sequence from the stored bit sequence using the error correction information in order to correct the corrected bit sequence further using the code; and for the case where the number of bit errors is less than (e.g., falls below) the error correction possibility of the code, the control unit can correct the stored bit sequence using the code and without using the error correction information. For example, the control unit can be configured to determine and/or obtain the first corrected bit sequence based on the stored bit sequence using the error correction information and/or to correct the first corrected bit sequence using the code responsive to a determination that the number of bit errors corresponds to (e.g., is greater than or equal to) the (maximum) error correction possibility of the code. Alternatively and/or additionally, the control unit can be configured to correct the stored bit sequence using the code without using the error correction information responsive to a determination that the number of bit errors is less than the (maximum) error correction possibility of the code.

In accordance with a further alternative embodiment, the method can also be configured as follows
1. Read data from the memory block
2. If assigned error correction information is available, then carry out a precorrection of the bits in the read data, using the error correction information
3. Carry out an error correction using the error correcting code of the (if appropriate precorrected) data from the memory block
4. If data are good and/or at least correctable, then output these (insofar as necessary corrected) data, otherwise output error indicator for indicating uncorrectable data.

In this embodiment, too, detection number of bit errors and correction number of bit errors of the error correcting code can be identical since correction is always carried out if error correction information is available. That is to say that the control unit can be configured to read the stored bit sequence from the electronic data memory; and to correct the stored bit sequence independently of an error correction possibility of the code using the error correction information, provided that the error correction information is present, to determine and/or obtain a first corrected bit sequence from the stored bit sequence.

The central memory area and/or the reserved area, for the error correction information, can be designed such that a maximum number of expected error correction entries can be stored. Alternatively and/or additionally, provision can likewise be made for the memory area to be extended dynamically. Indirectly the addition of the error correction information can help to improve the reliability of a memory with regard to the data retention errors. In an optimum case, the full error correction capability of the basic error correcting code can be used exclusively for the data retention errors. In accordance with exemplary embodiments, provision can be made for carrying out, with regard to the read performance, a kind of prestorage and/or prereading of the error correction information, for example during starting-up and/or booting of the device. This makes it possible to avoid additional read accesses in a case where an entry that is uncorrectable by means of the error correcting code is present.

Some exemplary embodiments are based on determining and/or ascertaining endurance errors in a memory as early as during storage. These endurance errors can to an extent withstand simple error correction mechanisms, for example simple rewriting of the erroneous bits. The number of data blocks comprising such endurance errors may be small (e.g., less than a threshold number of data blocks), and so separately storing the error correction information, compared with increasing the error correction capability of the error correcting code, entails a significantly smaller extent of additional memory, which is advantageous. These requirements can be fulfilled for example in the case of resistive RAM memories and other typical nonvolatile memories. These include for example flash memories, where erased bits may have endurance errors. Bit-by-bit erase operations are impossible in flash memories.

The error correction information can be written within a threshold duration of time after (e.g., directly after) the storage-writing/programming of a data block, but can also be written at a later point in time, for example if additional erroneous bits are determined and/or ascertained. The use of error correction information does not exclude a combination of such a mechanism with other mechanisms, for instance storage of data at alternative and/or additional memory addresses.

Although some aspects have been described in association with a device, it goes without saying that these aspects also constitute a description of the corresponding method, and so a block and/or a component of a device should also be understood as a corresponding method act and/or as a feature of a method act. Analogously thereto, aspects that have been described in association with and/or as a method act also constitute a description of a corresponding block, detail and/or feature of a corresponding device.

Depending on specific implementation requirements, exemplary embodiments of the present disclosure can be implemented in hardware and/or in software. The implementation can be effected using a digital storage medium, for example a floppy disk, a DVD, a Blu-ray disk, a CD, a ROM, a PROM, an EPROM, an EEPROM and/or a FLASH memory, a hard disk and/or some other magnetic and/or optical storage unit on which are stored electronically readable control signals which can interact and/or interact with a programmable computer system in such a way that the respective method is carried out. Therefore, the digital storage medium can be computer-readable. Some exemplary embodiments according to the present disclosure thus comprise a data carrier comprising electronically readable control signals which are able to interact with a programmable computer system in such a way that one of the methods described herein is carried out.

Generally, exemplary embodiments of the present disclosure can be implemented as a computer program product comprising a program code wherein the program code is effective for carrying out one of the methods when the computer program product runs on a computer. The program code can for example also be stored on a machine-readable carrier.

Other exemplary embodiments comprise the computer program for carrying out one of the methods described herein, where the computer program is stored on a machine-readable carrier.

In other words, an exemplary embodiment of a method according to the present disclosure is thus a computer program comprising a program code for carrying out one or more of the methods described herein when the computer program runs on a computer. An exemplary embodiment of the methods according to the invention is thus a data carrier (and/or a digital storage medium and/or a computer-readable medium) on which the computer program for carrying out one or more of the methods described herein is recorded.

An exemplary embodiment of a method according to the invention is thus a data stream and/or a sequence of signals which constitute(s) the computer program for carrying out one or more of the methods described herein. The data stream and/or the sequence of signals can be configured for example to the effect of being transferred via a data communication connection, for example via the Internet.

An exemplary embodiment comprises a processing unit, for example a computer and/or a programmable logic component, which is configured and/or adapted to the effect of carrying out one or more of the methods described herein.

An exemplary embodiment comprises a computer on which the computer program for carrying out one or more of the methods described herein is installed.

In some exemplary embodiments, a programmable logic component (for example a field programmable gate array, an FPGA) can be used to carry out one, some and/or all functionalities of the methods described herein. In some exemplary embodiments, a field programmable gate array can interact with a microprocessor in order to carry out one or more of the methods described herein. Generally, in some exemplary embodiments, the methods are carried out on the part of an arbitrary hardware device. The arbitrary hardware device can be universally usable hardware such as a computer processor (CPU) and/or hardware specific to the method, such as an ASIC, for example.

The exemplary embodiments described above merely constitute an illustration of the principles of the present invention. It goes without saying that modifications and variations of the arrangements and details described herein will be apparent to others skilled in the art. Therefore, the intention is for the invention to be restricted only by the scope of protection of the following claims and not by the specific details which have been presented on the basis of the description and the explanation of the exemplary embodiments herein.

The invention claimed is:

1. A device, comprising:
   an electronic data memory; and
   a control unit configured to:
      store a bit sequence in the electronic data memory as a stored bit sequence;
      check the stored bit sequence for bit errors;
      generate error correction information comprising information about a correct bit value in the stored bit sequence; and
      store the error correction information, comprising the information about the correct bit value in the stored bit sequence, in the electronic data memory.

2. The device of claim 1, comprising a coder configured to:
   determine a second bit sequence; and
   code the second bit sequence, using a code, to generate a coded bit sequence, wherein the control unit is configured to:
      store the coded bit sequence as the stored bit sequence in the electronic data memory; and
      determine the error correction information for the coded bit sequence.

3. The device of claim 2, wherein the coder is configured to select the code for correcting a correction number of bit errors and detecting a detection number of bit errors, wherein the detection number of bit errors is greater than the correction number of bit errors.

4. The device of claim 3, wherein the control unit is configured to:
   determine a number of bit errors in the stored bit sequence; and
   perform the storing the error correction information responsive to the number of bit errors being at least one of equal to or greater than a bit error threshold value.

5. The device of claim 4, wherein the bit error threshold value corresponds at most to the correction number of bit errors.

6. The device of claim 1, wherein the control unit is configured to check the stored bit sequence for write errors that have occurred at least one of during or after the storing the bit sequence as the stored bit sequence.

7. The device of claim 6, wherein the control unit is configured to perform the checking the stored bit sequence within a threshold duration of time after the storing the bit sequence as the stored bit sequence.

8. The device of claim 1, wherein the control unit is configured to:
convert the error correction information into an error correction bit sequence; and
store, as a second bit sequence in the electronic data memory, at least one of the error correction bit sequence or a third bit sequence derived based on the error correction bit sequence.

9. The device of claim 1, wherein the control unit is configured to:
determine if there is at least one bit error in the stored bit sequence;
repeat the storing the bit sequence in the electronic data memory based on the at least one bit error;
check the bit sequence stored in the electronic data memory for bit errors after the repeating the storing the bit sequence; and
perform the storing the error correction information responsive to a number of repetitions, of the repeating the storing the bit sequence, at least one of reaching or exceeding a repetition threshold value.

10. The device of claim 1, wherein the control unit is configured to store the error correction information in an area reserved for the error correction information in the electronic data memory.

11. The device of claim 10, wherein the area reserved for the error correction information has a number of addressable memory blocks, wherein the number of addressable memory blocks is based on an expected number of endurance errors of memory cells of the electronic data memory.

12. The device of claim 1, wherein the control unit is configured to:
obtain a plurality of bit sequences for storage in the electronic data memory;
store the plurality of bit sequences in the electronic data memory in accordance with a bit sequence address order by storing each bit sequence of the plurality of bit sequences at an address in the electronic data memory;
determine a plurality of items of error correction information for the plurality of bit sequences by determining, for each bit sequence of the plurality of bit sequences, an assigned item of error correction information; and
store the plurality of items of error correction information in the electronic data memory in accordance with an error correction address order, opposite the bit sequence address order, by storing each item of error correction information of the plurality of items of error correction information at an address in the electronic data memory.

13. The device of claim 1, wherein the error correction information comprises an address of a data block in which the stored bit sequence is stored, an indication of at least one erroneous bit in the data block and an indication of a correct value of the at least one erroneous bit.

14. The device of claim 1, wherein the error correction information is indicative of a validity of the error correction information.

15. The device of claim 1, wherein the stored bit sequence is stored at an address of the electronic data memory, wherein the control unit is configured to:
overwrite the stored bit sequence with an updated bit sequence at the address; and
one of:
determine that no error correction information is required for the updated bit sequence and cancel the error correction information; or
determine that the updated bit sequence has a different bit error pattern than the stored bit sequence and adapt the error correction information to correspond to second error correction information of the updated stored bit sequence.

16. The device of claim 1, wherein the control unit is configured to:
read a second stored bit sequence;
check the second stored bit sequence for bit errors;
generate second error correction information; and
one of:
store the second error correction information; or
use the second error correction information to update third error correction information for the second stored bit sequence.

17. The device of claim 1, wherein the control unit is configured to:
read the error correction information, wherein the error correction information is assigned to the stored bit sequence; and
at least partly correct the stored bit sequence using the error correction information to determine a corrected bit sequence.

18. The device of claim 1, wherein the control unit is configured to shift a decision threshold for distinguishing a logic state of a read bit for the checking the stored bit sequence for bit errors.

19. A device comprising:
an electronic data memory configured to store a stored bit sequence; and
a control unit configured to:
determine stored error correction information assigned to the stored bit sequence, wherein the stored error correction information is stored in the electronic data memory and comprises information about a correct bit value in the stored bit sequence; and
at least partly correct the stored bit sequence using the stored error correction information stored in the electronic data memory to determine a corrected bit sequence.

20. The device of claim 19, wherein the stored error correction information is indicative of at least one of:
at least one bit position at which a bit error is present in the stored bit sequence; or
a value of a bit at the at least one bit position in an error-free state.

21. The device of claim 19, wherein the stored bit sequence is coded based on a code for detecting and correcting bit errors, wherein the device is configured to:
decode the corrected bit sequence using the code; and
correct one or more residual bit errors in the corrected bit sequence.

22. The device of claim 19, wherein a second stored bit sequence is coded based on a code for detecting and correcting bit errors, wherein the control unit is configured to:
read the second stored bit sequence from the electronic data memory;
determine whether a number of bit errors in the second stored bit sequence exceeds an error correction possibility of the code; and
one of:

responsive to a determination that the number of bit errors exceeds the error correction possibility of the code:
  determine, using second error correction information assigned to the second stored bit sequence, a second corrected bit sequence based on the second stored bit sequence; and
  correct the second corrected bit sequence using the code; or
responsive to a determination that the number of bit errors does not exceed the error correction possibility of the code, correct the second stored bit sequence using the code without using the second error correction information.

23. The device of claim 19, wherein a second stored bit sequence is coded based on a code for detecting and correcting bit errors, wherein the control unit is configured to:
read the second stored bit sequence from the electronic data memory;
determine that a number of bit errors in the second stored bit sequence can be corrected by an error correction possibility of the code; and
one of:
  responsive to a determination that the number of bit errors corresponds to the error correction possibility of the code:
    determine, using second error correction information assigned to the second stored bit sequence, a second corrected bit sequence based on the second stored bit sequence; and
    correct the second corrected bit sequence using the code; or
  responsive to a determination that the number of bit errors is less than the error correction possibility of the code, correct the second stored bit sequence using the code without using the second error correction information.

24. The device of claim 19, wherein the stored bit sequence is coded based on a code for detecting and correcting bit errors, wherein the control unit is configured to:
read the stored bit sequence from the electronic data memory; and
perform the at least partly correcting the stored bit sequence, independently of an error correction possibility of the code, using the stored error correction information.

25. The device of claim 19, wherein the electronic data memory is at least one of a nonvolatile memory or a resistive Random Access Memory (RAM).

26. The device of claim 19, wherein the device is configured to, upon the device being started up, load available error correction information for the electronic data memory into at least one of a volatile memory, a RAM or a register, of the device.

27. The device of claim 19, wherein:
items of error correction information are stored in the electronic data memory in accordance with an error correction address order; and
bit sequences are stored in the electronic data memory in accordance with a bit sequence address order different than the error correction address order.

28. The device of claim 19, wherein the control unit is configured to:
check the stored bit sequence for bit errors;
generate the stored error correction information; and
store the stored error correction information.

29. The device of claim 19, wherein the device is configured as a smart card.

30. A method, comprising:
storing a bit sequence in an electronic data memory as a stored bit sequence;
checking the stored bit sequence for bit errors;
generating error correction information comprising information about a correct bit value in the stored bit sequence, wherein the error correction information is indicative of a validity of the error correction information; and
storing the error correction information.

31. A method, comprising:
determining stored error correction information assigned to a stored bit sequence, wherein the stored error correction information comprises information about a correct bit value in the stored bit sequence; and
at least one of:
  responsive to a determination that a number of bit errors in the stored bit sequence at least one of exceeds an error correction possibility of a code or can be corrected by the error correction possibility of the code:
    determining, using the stored error correction information, a corrected bit sequence based on the stored bit sequence; and
    correcting the corrected bit sequence using the code;
  responsive to a determination that the number of bit errors does not exceed the error correction possibility of the code, correcting the stored bit sequence using the code without using the stored error correction information; or
  at least partly correcting the stored bit sequence, independently of an error correction possibility of the code, using the stored error correction information to determine a corrected bit sequence.

* * * * *